United States Patent [19]

Matsueda

[11] Patent Number: 5,247,289
[45] Date of Patent: Sep. 21, 1993

[54] LIQUID CRYSTAL DISPLAY DEVICE WITH COMMONLY CONNECTED CAPACITOR ELECTRODES

[75] Inventor: Yojiro Matsueda, Suwa, Japan

[73] Assignee: Seiko Epson Corp., Tokyo, Japan

[21] Appl. No.: 628,917

[22] Filed: Dec. 14, 1990

[30] Foreign Application Priority Data

Dec. 15, 1989 [JP] Japan .................... 1-325037

[51] Int. Cl.$^5$ .................................... G09G 3/36
[52] U.S. Cl. ............................ 345/98; 359/59
[58] Field of Search .......... 340/718, 719, 784, 765; 359/54, 55, 57, 58, 59, 87, 88

[56] References Cited

U.S. PATENT DOCUMENTS

| | | | |
|---|---|---|---|
| 4,393,380 | 7/1983 | Hosokawa et al. | 340/784 |
| 4,431,271 | 2/1984 | Okubo | 340/784 |
| 4,687,298 | 8/1987 | Aoki et al. | 359/59 |
| 4,733,948 | 3/1988 | Kitahara | 359/59 |
| 4,842,371 | 6/1989 | Yasuda et al. | 340/784 |

FOREIGN PATENT DOCUMENTS

| | | | |
|---|---|---|---|
| 0194315 | 9/1986 | European Pat. Off. | |
| 0341003 | 11/1989 | European Pat. Off. | |
| 0376329 | 7/1990 | European Pat. Off. | |
| 0273838 | 11/1988 | Japan | 340/784 |
| 2050668 | 1/1981 | United Kingdom | |

OTHER PUBLICATIONS

Y. Matsueda et al., "Optimization of 0.94-in. Poly-Si TFT Light Valve for LCD Projector", *Japan Display*'89, pp. 418-421.

M. Shibusawa et al., "A 212-Line/in. Full-Color TFT-LCD for Cockpit Use", *SID 89 Digest*, pp. 230-233.

O. Tomita et al., "A 6.5-in.-Diagonal TFT-LCD Module for Liquid Crystal TV", *SID 89 Digest*, pp. 151-154.

*Primary Examiner*—Richard Hjerpe
*Attorney, Agent, or Firm*—W. Douglas Carothers, Jr.

[57] ABSTRACT

A liquid crystal display device is provided with a storage capacitor relative to each pixel electrode, and a common electrode is electrically connected to the storage capacitors of adjacent pixel structures between pairs of adjacent scan lines comprising paired odd and even numbered scan lines. With the utilization of this common electrode structure comprising commonly connected capacitor lines, the number of common electrodes necessary for electrically connecting storage capacitors of the pixel structures can be reduced by one-half and the number of the source electrodes connecting portions of the TFTs can be reduced by one-half as compared with the conventional technique utilizing a single storage capacitor per pixel structure. Therefore, a high aperture ratio can be maintained in spite of a decrease in pixel pitch to form a more dense pixel array. The common electrode lines could alternatively be formed between pairs of adjacent signal lines rather than pairs of adjacent scan lines, i.e., the common capacitor connection of the storage capacitors by the common electrodes is primary and the directional orientation of the common electrodes is secondary.

10 Claims, 9 Drawing Sheets

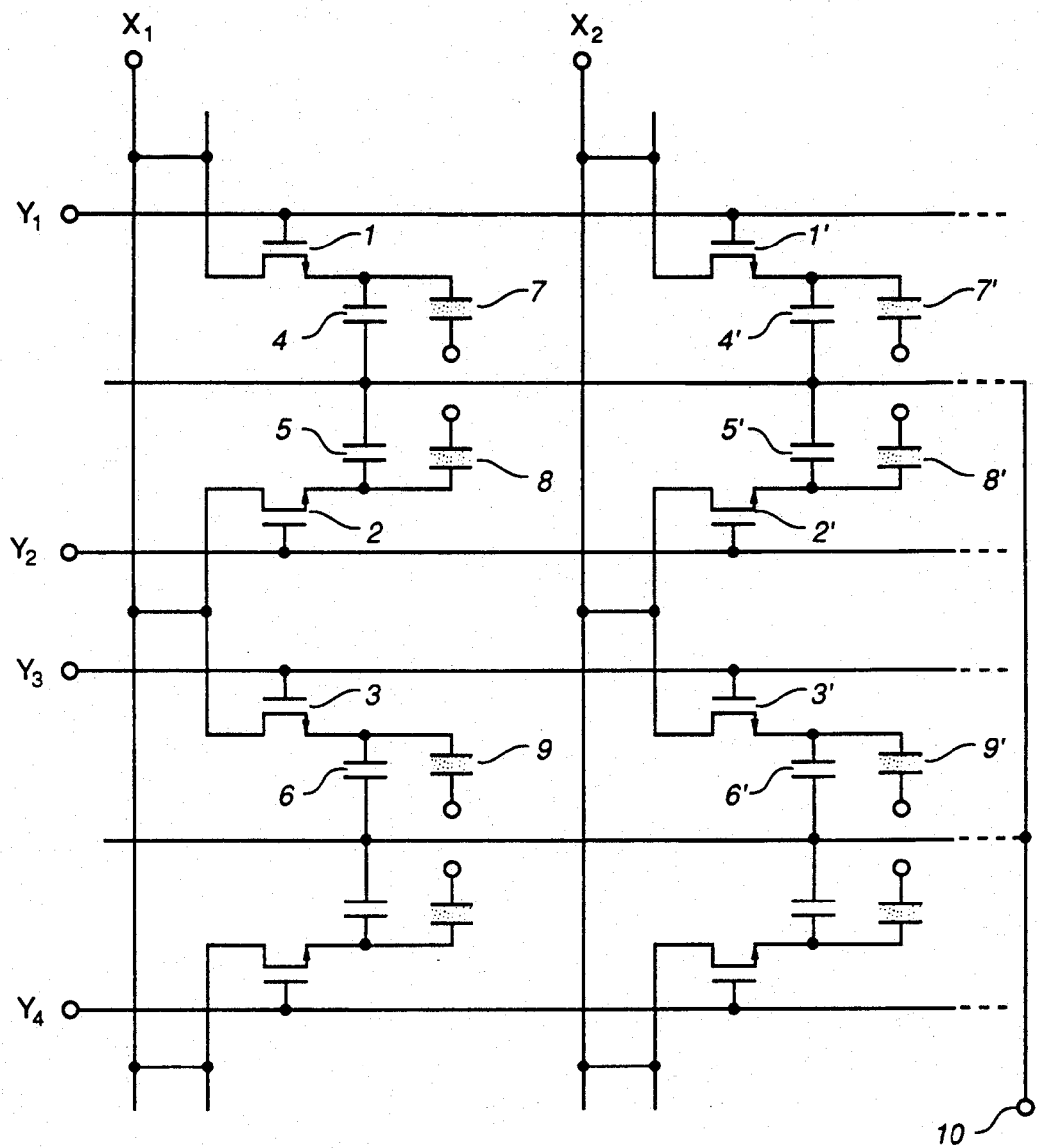
FIG._1

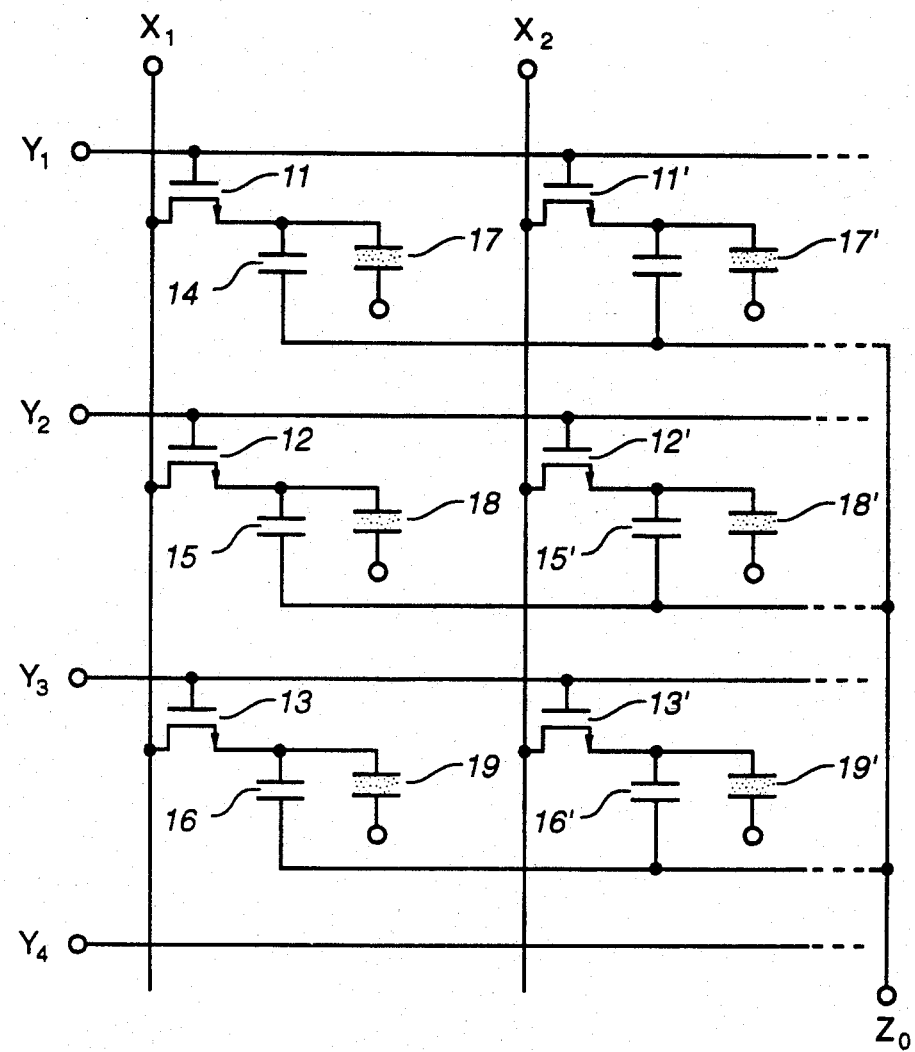
FIG._2
(PRIOR ART)

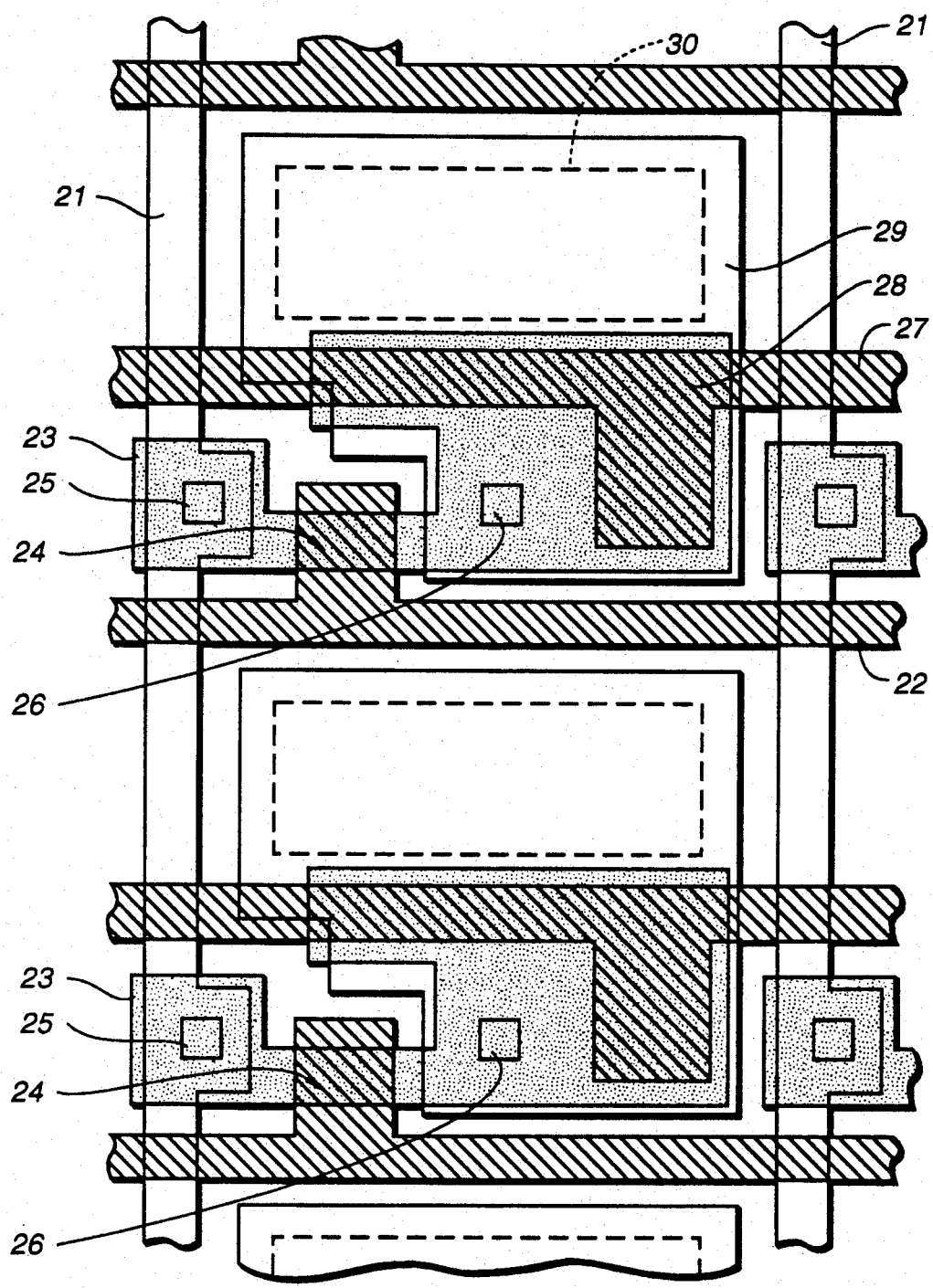
FIG._3
*(PRIOR ART)*

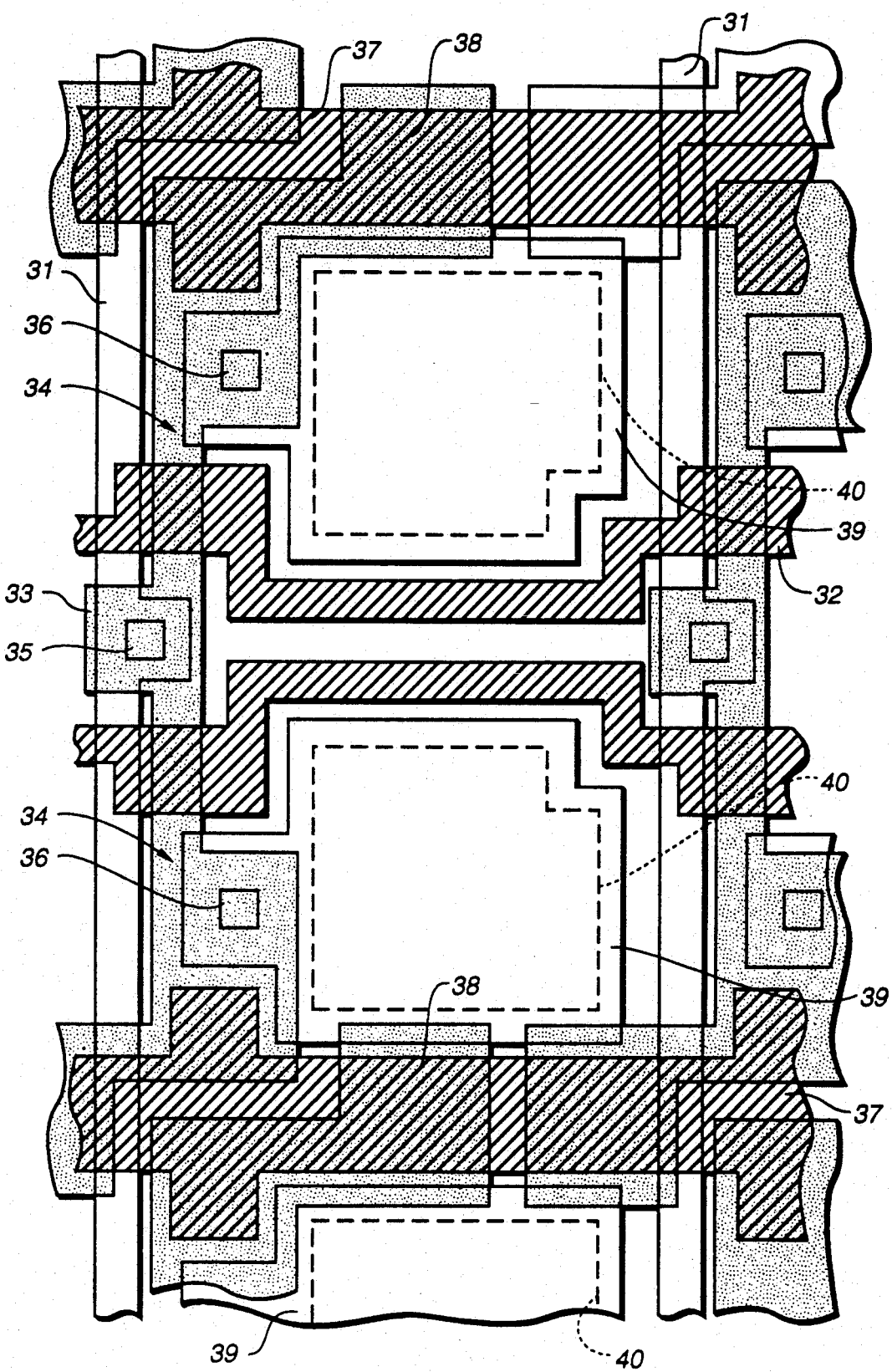
FIG._4

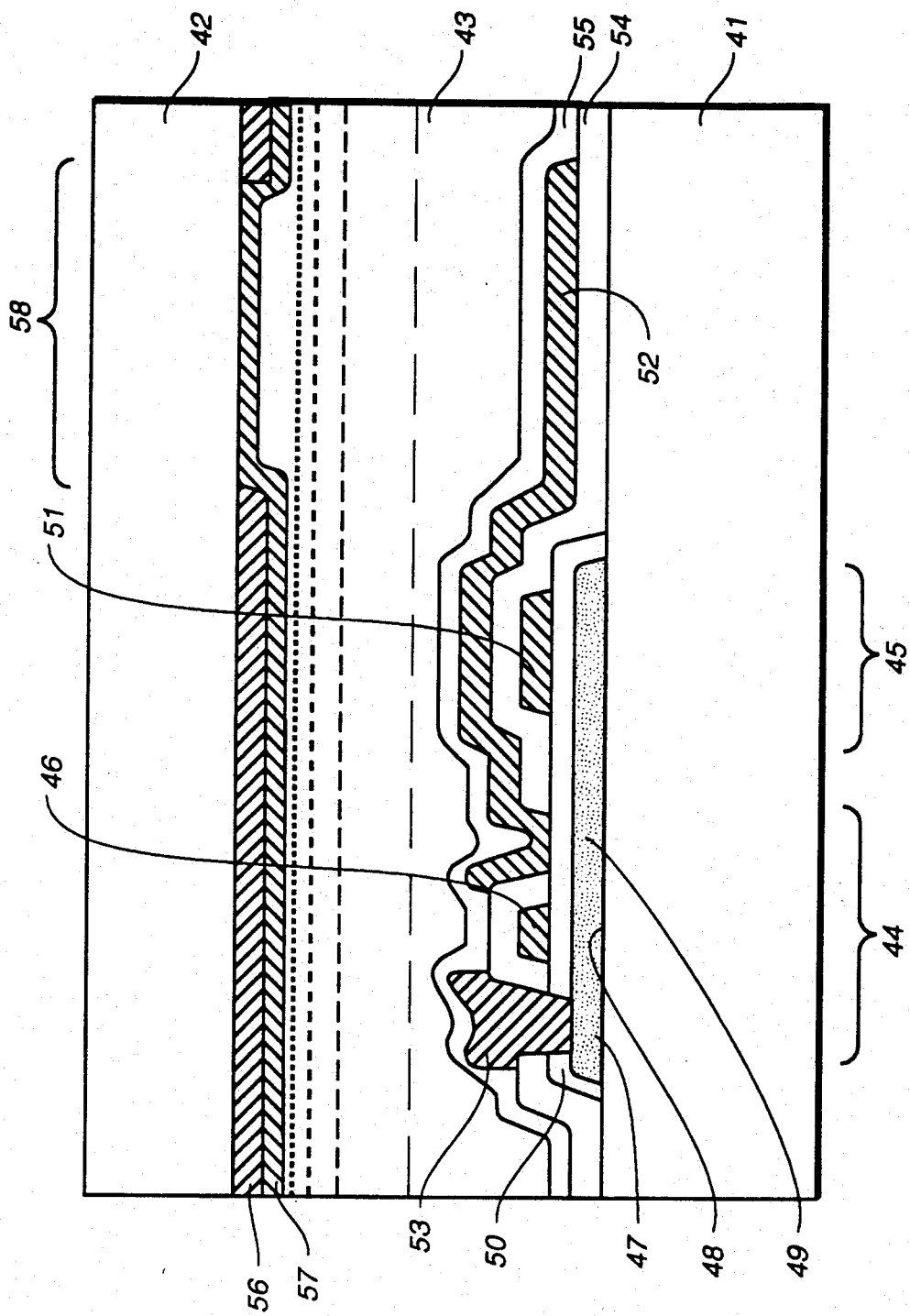
FIG._5

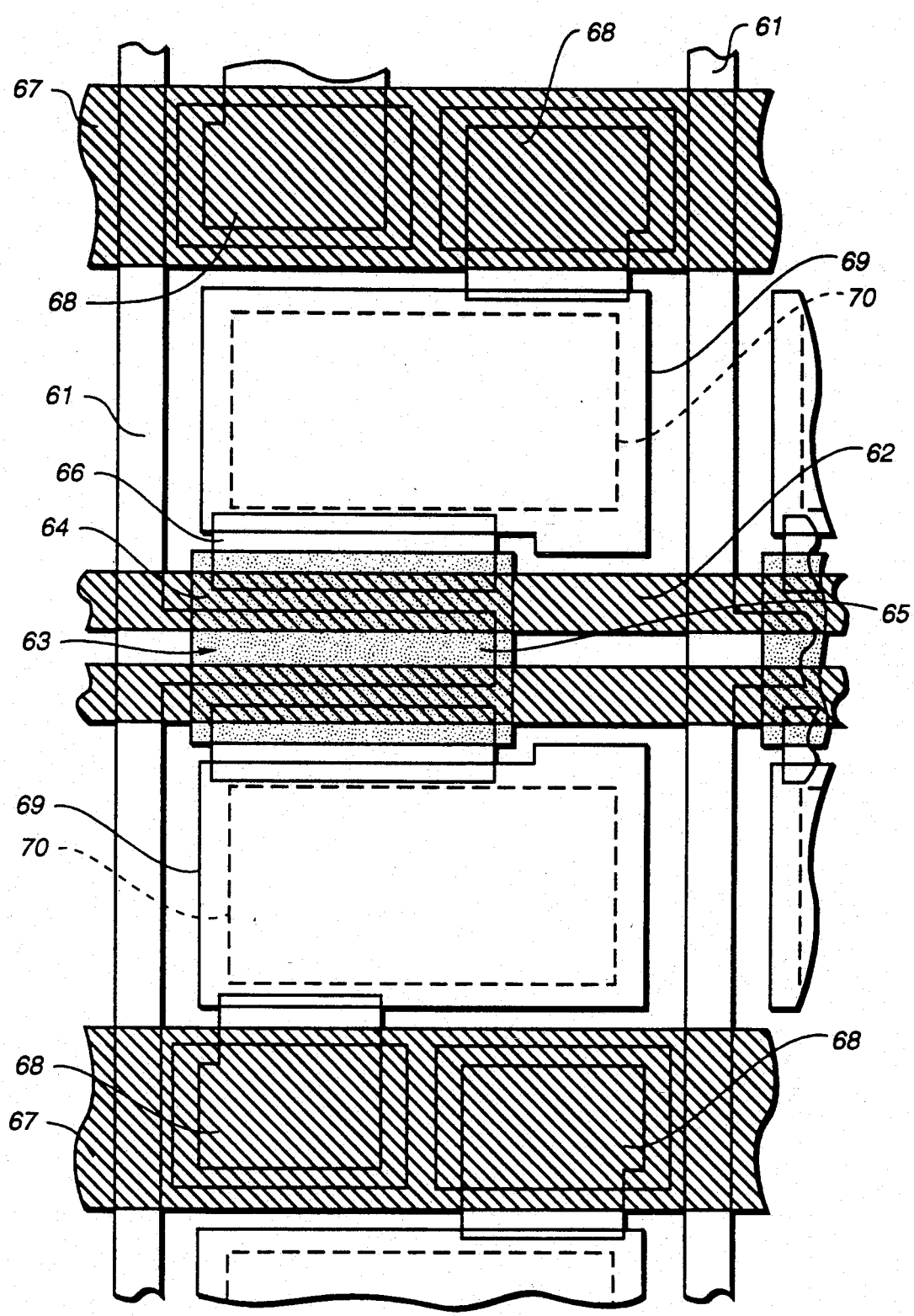
*FIG._6*

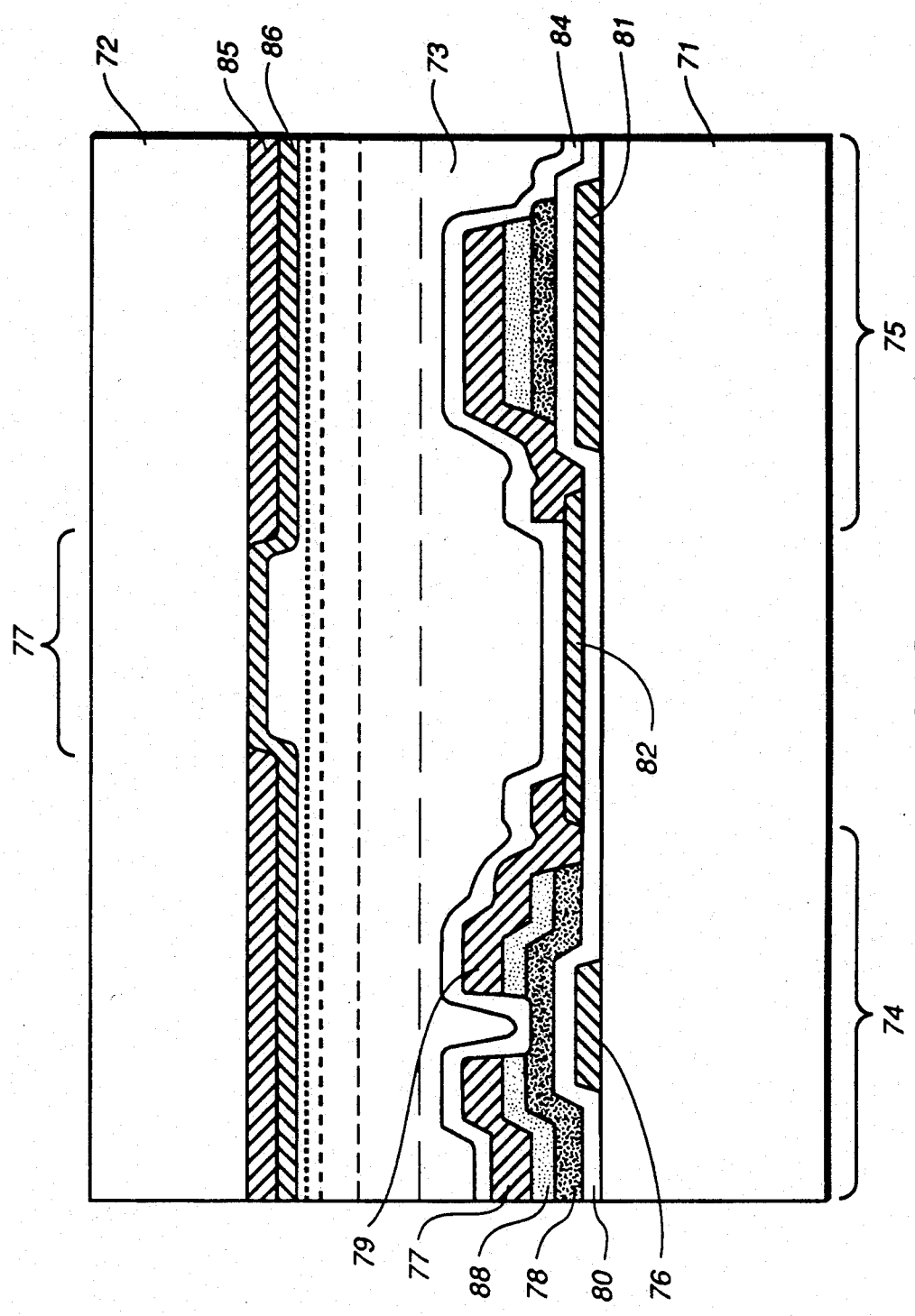
FIG._7

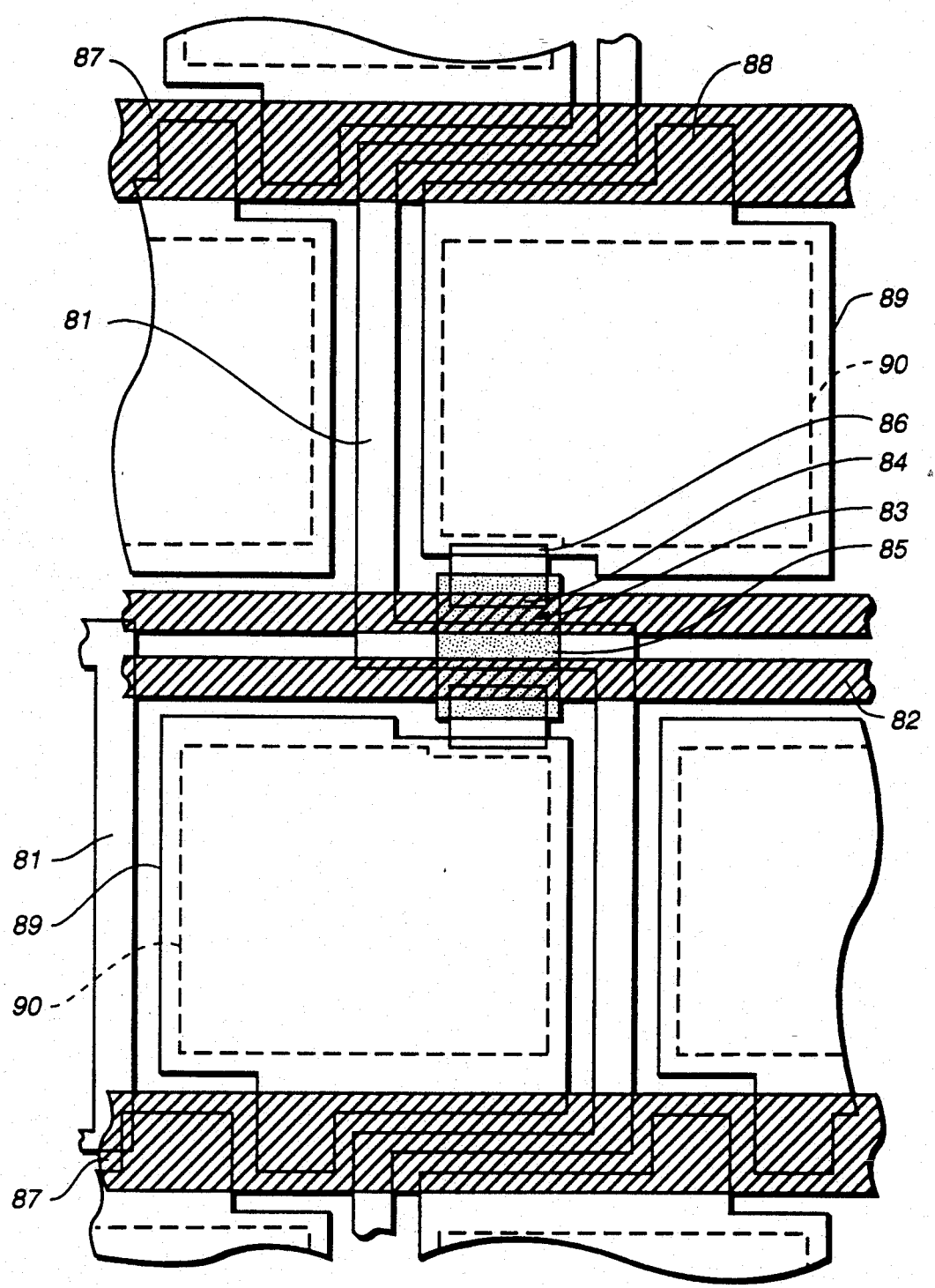
FIG._8

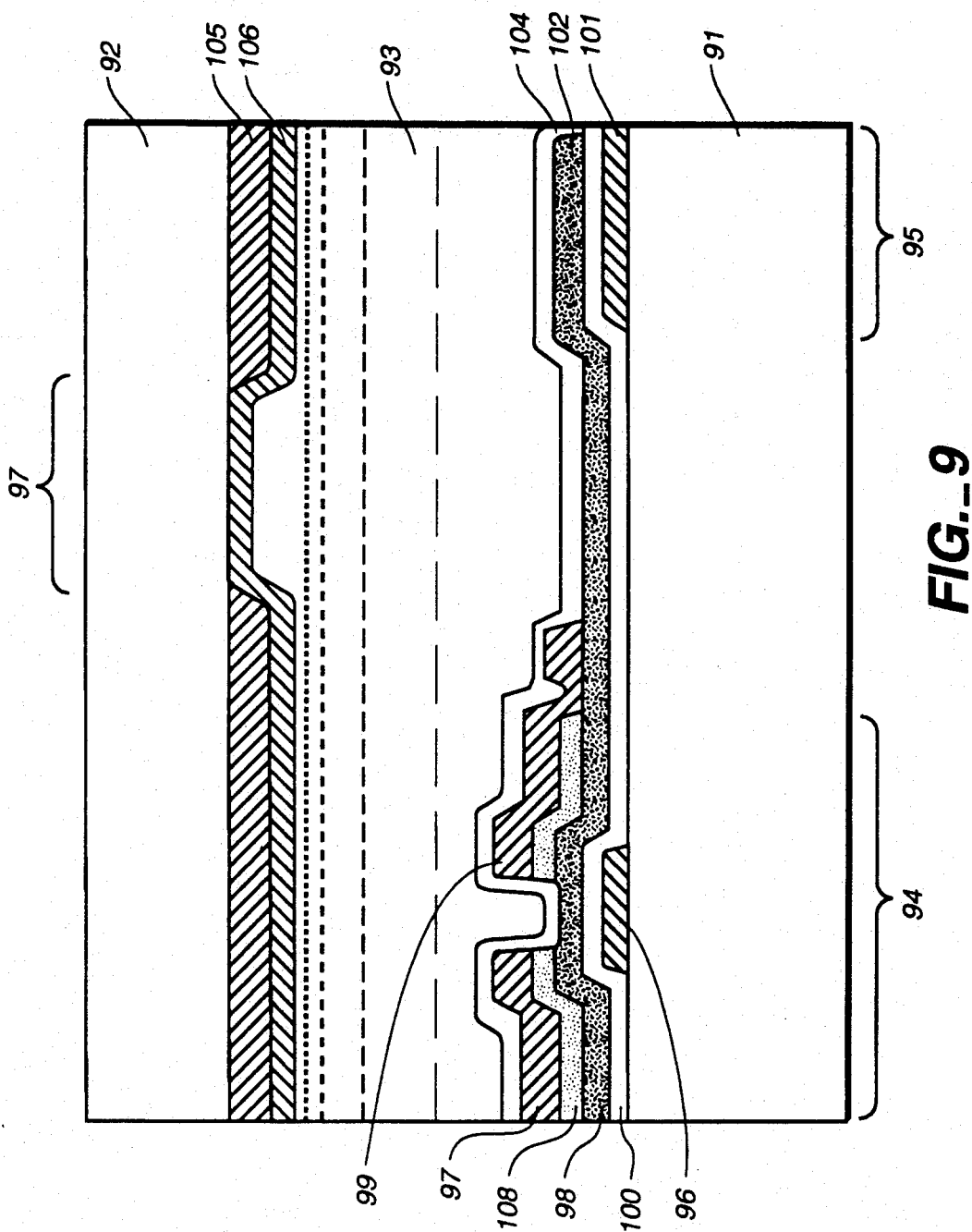
FIG._9

LIQUID CRYSTAL DISPLAY DEVICE WITH COMMONLY CONNECTED CAPACITOR ELECTRODES

BACKGROUND OF THE INVENTION

This invention relates generally to a liquid crystal display device utilizing thin film transistors (TFT) and more particularly to a liquid crystal display having storage capacitors of adjacent row or column liquid crystal cell circuits connected to a common electrode comprising commonly connected capacitor lines.

An example of a liquid crystal display device utilizing TFT switching devices is described in an article to Matsueda et al., entitled "Optimization of 0.94-in. Poly-Si TFT Light Valve for LCD Projector", The Japan Display 89 Digest, pages 418-421, Date, 1989. As an example of the display element circuit of Matsueda et al. employing TFT switching devices is illustrated in FIG. 2. The column signal lines are $X_1, X_2 \ldots$ to which image signals are applied and the row scan lines are $Y_1, Y_2, Y_3, Y_4 \ldots$ to which TFT switching signals are applied. TFT devices 11, 12, 13 are provided at the cross point between signal line $X_1$ and scan lines $Y_1, Y_2, Y_3 \ldots$ adjacent to these respective devices. TFT devices 11', 12', 13' are provided at the cross point between signal line $X_2$ and scan lines $Y_1, Y_2, Y_3 \ldots$ adjacent to these respective devices and so on. TFTs 11, 12 and 13 are turned ON or OFF in accordance with the timing of a selective pulses applied to respective scan lines $Y_1, Y_2, Y_3 \ldots$. The image signal applied to signal line $X_1$ is written into respective liquid crystal display (LCD) elements represented by capacitances 17, 18 and 19 and storage capacitors 14, 15 and 16 through a respective activated TFT 11, 12 and 13. Thus, for example, TFT 11, storage capacitor 14 and LCD element 17 represent one pixel structure.

FIG. 3 is a plan view showing an example of a pixel portion of the liquid crystal display device of FIG. 2. TFT 24 is arranged in the crossing point between signal line 21 and scan line 22. Semiconductor thin film 23 forms the source/drain and channel for TFT 24. Contact hole 25 provides for connection of the source of TFT 24 with signal line 21, and contact hole 26 provides for connection the drain of TFT 24 with pixel electrode 29. Storage capacitor 28 is formed between the drain of TFT 24 and common electrode 27. In the case of a transmissive type display device, the portion indicated as aperture 30 is the image display region for a pixel structure.

The pixel structures are required to be fabricated with high density in order to achieve high resolution quality images. However, a decrease in pixel pitch results in a corresponding decrease in capacitance of the liquid crystal and, therefore, it is necessary to form adjacent storage capacitors to provide for sufficient capacitance to produce the same high image resolution quality.

Furthermore, miniaturization relative to the size of the TFT devices is limited by the manufacturing process. Therefore, when the pixel pitch of the LCD elements is decreased, ratio of the regions occupied by the combination of the storage capacitor and TFT become correspondingly larger, and the ratio of the regions occupied by the image display apertures must become correspondingly smaller. A decrease in aperture ratio correspondingly results in increased darkness in the display and, further, the image quality and resolution is significantly reduced since the light shielding pattern surrounding the display apertures becomes larger so that the displayed image has a thick lattice appearance.

It is an object of this invention to provide a projection type liquid crystal display device to solve the above mentioned problems relative to image darkness and quality.

It is another object of this invention to provide a liquid crystal display device having a high aperture ratio with decreased pixel pitch.

SUMMARY OF THE INVENTION

According to this invention, a liquid crystal display device is provided with a storage capacitor relative to each pixel electrode, and a common electrode is electrically connected to the storage capacitors of adjacent pixel structures between pairs of adjacent scan lines comprising paired odd and even numbered scan lines. With the utilization of this common electrode structure comprising commonly connected capacitor lines, the number of common electrodes necessary for electrically connecting storage capacitors of the pixel structures can be reduced by one-half and the number of the source electrodes connecting portions of the TFTs can be reduced by one-half as compared with the conventional technique utilizing a single storage capacitor per pixel structure. Therefore, a high aperture ratio can be maintained in spite of a decrease in pixel pitch to form a more dense pixel array.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a circuit diagram of a portion of a liquid crystal display device comprising this present invention.

FIG. 2 is a circuit diagram of a portion of a conventional liquid crystal display device.

FIG. 3 is a plan view of a portion of a formed circuit arrangement of pixel structures of the conventional liquid crystal display device.

FIG. 4 is a plan view of a portion of a formed circuit arrangement of pixel structures for a first embodiment comprising this invention.

FIG. 5 is a cross sectional view of a portion of the arrangement shown in FIG. 4.

FIG. 6 is a plan view of a portion of a formed circuit arrangement of pixel structures for a second embodiment comprising this invention.

FIG. 7 is a cross sectional view of a portion of the arrangement shown in FIG. 6.

FIG. 8 is a plan view of a portion of a formed circuit arrangement of pixel structures for a third embodiment comprising this invention.

FIG. 9 is a cross sectional view of a portion of the arrangement shown in FIG. 8.

DESCRIPTION OF THE PREFERRED EMBODIMENTS

Reference is now made to FIG. 1 wherein there is shown a schematic circuit diagram of this invention. In FIG. 1, TFTs 1, 2 and 3 are provided respectively at the cross points between signal line $X_1$ and scan lines $Y_1, Y_2, Y_3 \ldots$. TFTs 1', 2' and 3' are provided respectively at the cross points between signal line $X_2$ and scan lines $Y_1, Y_2, Y_3$... and so on. TFTs 1-3 are turned ON or OFF in accordance with a selective timing pulse applied to respective scanning lines $Y_1, Y_2, Y_3$.... The image signal applied to signal line $X_1$ and is written into respective display elements represented by liquid crystal capacitance display elements represented by liquid crystal capacitance 7, 8 and 9 and also into storage capacitor 4, 5 and 6 through respectively activated TFTs 1-3. In this invention, common electrode 10, comprising a commonly connected capacitor line for electrically connecting storage capacitors, is arranged in the ratio of one to every two scan lines. For example, since storage capacitor 4 and 5 are formed on similar electrode wiring arrangements, a sufficient amount of necessary capacitance can be formed within a smaller occupied region as compared with the conventional structure wherein the storage capacitor is formed relative to each electrode wiring. Further, since a pair of TFTs for upper and lower pixels are arranged in parallel, pairs of sources for adjacent TFTs can be commonly connecting together to a corresponding signal line. For example, the connecting point between TFT 2 and 3 and signal line $X_1$ is formed as a single portion. Therefore, the occupied area of the TFTs can be reduced.

In FIG. 1, common electrode 10 is arranged between adjacently disposed odd and even numbered scan lines, e.g. an odd numbered scan line followed by an even numbered scan line or an even numbered scan line followed by an odd numbered scan line.

FIG. 4 is a plan view of a first embodiment of the foregoing described pixel structure comprising the liquid crystal display device of this invention. TFT 34 is arranged to have its cross point between signal line 31 and scan line 32. Semiconductor thin film 33 forms the source/drain and the channel for TFT 34. Numeral 35 designates a contact hole for connecting the source of TFT for upper and lower pixels with the signal line 31. Contact hole 36 provides for connecting the drain of TFT 34 with pixel electrode 39. Storage capacitor 38 is formed between the drain of TFT 34 and common electrode 37. Common electrode 37 is arranged with the storage capacitor of a pair of adjacent pixel structures positioned on adjacent sides of electrode 37. In the case of transmissive type display device, the portion indicated as aperture 40 is the effective image display region. Since the regions around aperture 40 deteriorate the image quality, these regions are covered with a light shield layer (not shown) to prevent penetration of light through these regions.

In the present embodiment, since common electrode 37 is arranged in a region between the pixel electrodes, which is not an essential region for the displayed image, high aperture ratio can be achieved. The area of aperture 40 in FIG. 4 is larger by about 30% compared to that for aperture 30 in FIG. 3. Thus, the image plane can be formed to be brighter by 30% relative to forming similar display elements having similar pixel pitch. Furthermore, since the form of aperture 40 can now fully approximate a square, as compared to a rectangular aperture 30 in the conventional case, the viewing lattice on the screen display becomes clearer thereby significantly improving the image quality. Also, if an inclined wiring pattern is employed, i.e., the layout of the wiring pattern is positioned at an oblique angle, e.g., 45°, relative to the plane of the structure so that the corners of the formed apertures take on a trimmed appearance rendering the apertures to look circular in contour.

Another characteristic of the invention is the degree of freedom achieved in the method of driving the display. As it is well known, the applied signals relative the NTSC or the HDTV standards are provided with the two interlaced fields. For displaying these signals relative to a liquid crystal display device, the line pair driving method often employed wherein two scan lines are formed in a pair to be selected by the same timing sequence for writing in data to the display and the combination of pairs of scan lines is changed relative to every field, i.e., to select a different pair for every field. Also, in this driving method, more complex peripheral apparatus, such as a field memory, is not required, and the response action of the image formed on the display is improved. Therefore, it is practical method for avoiding annoying flicker. However, in the structure of the conventional liquid crystal display device as shown in FIG. 3, since the pixel electrode is approximated to the former scan line, the offset voltage caused by the capacitive coupling between the pixel electrode and the scan electrode becomes different relative to two adjacent scan lines. Therefore, as a result, the brightness relative to pixels connected relative to adjacent scan lines become different. However, in the liquid crystal display device of this invention illustrated in FIG. 4, since the pixel electrode and the adjacent scan line are no longer adjacent, this problem is eliminated and a uniformed image plane can be achieved even if the above mentioned driving method is utilized. It is, therefore, possible to carry out either the conventional serial scan technique or the conventional technique of non-interlaced scan lines driven at double rate, and the driving system can be selected on a case by case approach.

When a color filter of the three primary colors of R (red), G (green), and B (blue) is employed, it is necessary to form the color filter arrangement with the vertical color (sequentially red, blue and green) stripes relative to the above mentioned driving method wherein two scan lines are concurrently selected. In employing the conventional driving method of the serial scan technique, the color filter arrangement may be of the mosaic type or of the triangle type.

FIG. 5 is a cross sectional view of a single pixel structure of the liquid crystal display device according to the embodiment of FIG. 4, which shows additional details of the construction of the liquid crystal display device or panel. In general, the liquid crystal display device comprises a TFT having two insulative substrates, in particular, liquid crystal material 43 is interposed between TFT substrate 41 and counter substrate 42. On TFT substrate 41, there is provided the arrangement for TFT 44 and holding storage capacitor 45. The particular structure shown in FIG. 5 is referred to as the coplaner type wherein source 47, channel 48 and drain 49 of TFT 44 are formed from the same type of semiconductor film. TFT 44 is of the self-alignment type wherein gate electrode 46 functions as a self aligned mask so that impurity is diffused into regions comprising source 47 and drain 49 via gate insulative film 50. The MOS capacitor formed between common electrode 51, formed from the same semiconductor film (e.g. a polycrystalline silicon film) as gate electrode 46, and drain 49 is utilized as the storage capacitor for the pixel structure.

There are two methods for forming this MOS capacitor. In a first method, the impurity is previously diffused into the above mentioned semiconductor film before forming the source/drain regions 47, 49. In this approach, the electric potential of common electrode 51 can be freely selected to be that of the power supply potential of the driver circuit or the potential of the opposite electrode. In a second method, the impurity is not previously diffused into the film so that common electrode 51 is formed while semiconductor thin film comprising source/drain regions 47, 49 remain undoped. In this case, since this semiconductor thin film beneath common electrode 51 becomes similar in nature to TFT channel 48 due to the self-aligning ion implant technique for forming source/drain regions 47, 49, the bias voltage applied to common electrode 51 must be higher than the potential of the applied video signal, preferably at least equal to or higher than the threshold voltage. Signal line 47 and drain pixel electrode 52 are respectively connected to source 47 and drain 49 of TFT through formed contact holes.

In the structure shown in FIG. 5, a storage capacitor is formed between pixel electrode 52 and common electrode 51 separated by interlayer insulator 54. This storage capacitance is formed when pixel electrode 52 is extended to overlap common electrode 51 as shown in the figure. As a consequence, the capacitance of this storage device is added to the capacitance of the MOS storage capacitance formed by common electrode 51 and the extension of the thin semiconductor layer from drain 49 separated by gate insulating film 50. Therefore, the holding storage capacitance for capacitor 45 in this case comprises the combination of two storage capacitances. If, however, pixel electrode 52 is made not to overlap with common electrode 51, the holding storage capacitance is the MOS storage capacitance.

In general, layer 54 can be formed with high precision and reduced defects, such as with the use of a thermal oxide formed film employed for gate insulative film 50, and, further, layer 54 can be made thinner for achieve excellent transmitting properties for TFT 44. Therefore, the MOS capacitance can be formed to have several times the capacity relative to interlayer insulator 52 with reduced defects.

Passivation film 55 between liquid crystal 43 and pixel electrode 52 protects thin film elements 44, 45 and also prevents any DC component from being applied to liquid crystal 43, even if a video signal containing a DC component is applied to pixel electrode 52. Light screen layer 56 is provided on counter substrate 42 to cover non-display portions of the image display to control the light leak current of TFT 44 and to achieve high quality images having large contrast ratio. Aperture 58, therefore, is the effective image display region for the displayed image pixel. Counter electrode 57 comprises a transparent electrode conductive film which covers the entire region in contact with liquid crystal 43, and liquid crystal 43 is driven by an electric field applied between pixel electrode 52 and counter electrode 57. When the liquid crystal display device of this embodiment is employed as a transmissive type display device, pixel electrode 52 comprises a transparent electro-conductive film, and when it is employed as a reflective type display device, pixel electrode 52 comprises a thin metal film.

FIG. 6 shows a plan view of a second embodiment for a pixel structure comprising the liquid crystal display device of this invention. TFT 63 is arranged to have its cross point between signal line 61 and scan line 62. Source 65 and drain 66 of TFT 63 are formed from a different thin layer from that of channel 64. Common electrode 67 is arranged relative to pairs of storage capacitors 68 for respective pixel structure on adjacent sides of common electrode 67. Pixel electrode 69 is connected with both drain 66 and storage capacitor 68 of TFT 63, as shown in FIG. 6. In the case of a transmissive type liquid crystal display device, the region indicated as aperture 70 is the effective image display portion of the pixel structure. Since those regions of the pixel structure outside aperture 70 are detrimental to the image display, a light shield layer is formed over the structure to prevent the permeation of light relative to these regions.

FIG. 7 is a cross sectional view of a single pixel structure of the liquid crystal display device according to the embodiment of FIG. 6, which shows additional details of the construction of the liquid crystal display device or panel. Liquid crystal material 73 is provided between a pair of insulative substrates, in particular, between TFT substrate 71 and counter substrate 72. On TFT substrate 71, there is provided the arrangement for TFT 74 and holding storage capacitor 75. The structure of TFT 74 is referred to as the reverse staggered type because the components comprising TFT 74 are formed upside down wherein the gate electrode is formed below the TFT channel whereas in a normal staggered type TFT, the gate is formed over the TFT channel, as is the case of FIG. 5. TFT 74 comprises formed gate electrode 76, gate insulation film 80, silicon or compound semiconductor thin film 78, which is undoped or lightly doped and forms the channel for TFT 74, and impurity incorporated silicon or compound semiconductor thin film 88 which is heavy doped and superimposed over semiconductor thin film 78. The overlapping portions of films 78 and 88 respectively form the source region and the drain region. Source electrode 77 and drain electrode 79 are formed on impurity incorporated semiconductor thin layer 88. Source electrode 77 is formed to be connected directly to signal line 61, and drain electrode 79 is formed to be connected to pixel electrode 82. An alternate structure for reverse staggered type TFT 74 is a normal staggered type TFT and storage capacitance similar to that illustrated in FIG. 5, except that the storage capacitance would be similarly positioned as shown in FIG. 7.

Storage capacitor 75 has a structure similar to that for the drain of TFT 74 comprising superimposed semiconductor thin film 78 and impurity incorporated semiconductor thin film 88. Storage capacitor 75 is arranged over common electrode 81, as separated by thin thermal oxide insulator layer 80, and is connected to pixel electrode 82 by means of the same film that forms source and drain electrodes 77, 79. Passivation layer 84 protects thin film elements 74, 75 and also prevents any DC component from being applied to liquid crystal 73, even if a video signal containing a DC component is applied to pixel electrode 82. Light screen layer 85 is provided on counter substrate 42 to cover non-display portions of the image display to control the light leak current of TFT 74 and to achieve high quality images having large contrast ratio. Aperture 77, therefore, is the effective image display region for the displayed image pixel. Counter electrode 86 comprises a transparent electrode conductive film which covers the entire region in contact with liquid crystal 73, and liquid crystal 73 is driven by an electric field applied between pixel electrode 82 and counter electrode 86.

FIG. 8 shows a plan view of a third embodiment for a pixel structure comprising the liquid crystal display device of this invention. The pixel structure illustrated in this figure is the so called triangular type pixel structure, which is often employed in video (HDTV or NTSC) applications, as opposed to the matrix type, which is more suitable in data applications. TFT 83 is arranged to have its cross point between serpentine signal line 81 and scan lines 82. As in the case of the FIG. 6 embodiment, source 85 and drain 86 of TFT 83 are formed from a different thin layer from that of channel 84. In this embodiment, serpentine signal line 81 is superposed on source 85 of the TFTs. Common electrode 87 is superposed on part of an extended portion 88 of a pair of pixel electrodes 89 formed adjacent to common electrode 87. The region indicated as aperture 90 is the effective image display portion of the pixel structure.

FIG. 9 is cross sectional view of a single pixel structure of the liquid crystal display device according to the embodiment of FIG. 8, which shows additional details of the construction of the liquid crystal display device or panel. Liquid crystal material 93 between a pair of insulative substrates, in particular, between TFT substrate 91 and counter substrate 92. On TFT substrate 91, there is provided the arrangement for TFT 94 and holding storage capacitor 95. The structure of TFT 94 is referred to as the reverse staggered type, as previously explained in connection with the embodiment of FIG. 7, and comprises gate insulation film 100 formed on gate electrode 96, semiconductor thin film 98, forming the channel for TFT 94, and impurity incorporated semiconductor thin film 108, which is superimposed over semiconductor thin film 98. Source electrode 97 and drain electrode 99 are formed on impurity semiconductor thin layer 108, and source electrode 97 comprise a part of signal line 81, and drain electrode 99 is formed to be connected to pixel electrode 102. In this embodiment, storage capacitor 95 is formed by superimposing pixel electrode 102 over common electrode 101 with gate insulative film 100 therebetween. Passivation layer 104 protects thin film elements 94, 95 and also prevents any DC component from being applied to liquid crystal 93, even if a video signal containing a DC component is applied to pixel electrode 102. Light screen layer 105 is provided on counter substrate 92 to cover non-display portions of the image display to control the light leak current of TFT 94 and to achieve high quality images having large contrast ratio. Aperture 97, therefore, is the effective image display region for the displayed image pixel. Counter electrode 106 comprises a transparent electrode conductive film which covers the entire region in contact with liquid crystal 93, and liquid crystal 93 is driven by an electric field applied between pixel electrode 102 and counter electrode 106.

While the invention has been described in conjunction with several specific embodiments, it is evident to those skilled in the art that many further alternatives, modifications and variations will be apparent in light of the forgoing description. As an example, it is within the scope of this invention, which would be readily understood by those skilled in the art, that the common electrode or capacitor lines 10 could also run vertically between columns of signal lines, X, rather than run horizontally between rows of scan lines, Y, to commonly connect storage capacitance relative to adjacently located storage capacitance in vertically adjacent columns of liquid crystal cells. In other words, this invention is not limited by the particular orthogonal direction or other such possible directions for the common electrode capacitor lines. As another alternative, each vertically formatted common electrode line 10 could be commonly connected to storage capacitance only on one side of each electrode line, e.g., in FIG. 1, one vertical common electrode line would be connected to the other side of capacitors 4, 5, 6 and so on, and the next adjacent vertical common electrode line would be connected to the other side of capacitors 4', 5', 6' and so on. Also, it is not necessarily required that the common electrodes be formed between pairs of scan lines or pairs of signal lines, although this would be the preferred implementation, particularly relative to the line pair driving method. Thus, the invention described herein is intended to embrace all such alternatives, modifications, applications and variations as may fall within the spirit and scope of the appended claims.

What is claimed is:

1. A liquid crystal display device comprising:
   a first insulative substrate,
   a plurality of columns of parallel signal lines and a plurality of rows of parallel scan lines formed on said first insulative substrate, said parallel scan lines formed in one orthogonal direction and said parallel signal lines formed in another orthogonal direction,
   a plurality of substantially parallel lines of spatially positioned pixel electrodes formed on said first insulative substrate with each of said pixel electrodes connected to a corresponding signal and scan line at crossing points of said orthogonal signal and scan lines, whereby said pixel electrodes are arranged in a matrix configuration,
   said parallel pixel electrode lines aligned with said parallel scan lines such that adjacent parallel pixel electrode lines are formed between two parallel scan lines so that in said another orthogonal direction two adjacent parallel scan lines alternate with two adjacent parallel pixel electrode lines,
   transistor means associated with each of said pixel electrodes comprising a gate and a source and drain domain and located at a crossing point of said signal and scan lines with its gate connected to the crosspoint scan line and with one of said domains connected to the crosspoint signal lines, said each of said pixel electrodes connected to the other of said domains of said transistor means,
   a second insulative substrate spatially disposed parallel to said first insulative substrate and having thereon a counter electrode,
   a liquid crystal interposed between said first and second insulative substrate,
   a single common conductor line formed between said adjacent pixel electrode lines, and
   a storage device formed on said first insulative substrate substantially adjacent to each of said pixel electrodes, each said storage device being coupled to a corresponding pixel electrode in said adjacent pixel electrode lines and also being coupled with one said single common conductor line.

2. The liquid crystal display device according to claim 1 wherein adjacently aligned transistor means in said another orthogonal direction connected relative to two adjacent parallel scan lines in said one orthogonal direction share a common source domain with said shared source domain connected to an adjacent crosspoint signal line.

3. The liquid crystal display device according to claim 2 wherein said adjacent scan line rows are concurrently selected when addressing said transistor means to said pixel electrodes.

4. The liquid crystal display device according to claim 2 wherein said adjacent scan line rows are sequentially selected when addressing said transistor means to said pixel electrodes.

5. A liquid crystal display device having a circuit arrangement comprising:
a matrix of formed pixel cells arranged in an orthogonal matrix of rows and columns,
each of said cells including a pixel electrode and a TFT with a first domain connected to said pixel electrode,
a storage device formed substantially adjacent to a respective pixel electrode and coupled on one side to said TFT first domain and said pixel electrode,
a plurality of first electrical lines for communication with said cells formed in a first direction relative to said orthogonal matrix,
a plurality of second electrical lines formed for communication with said cells formed in a second direction relative to said orthogonal matrix, said second direction being substantially orthogonal relative to said first direction,
adjacent rows of said pixel electrodes formed between adjacent rows of said first electrical lines so that adjacent pixel electrode rows are alternated with adjacent first electrical line rows along said second direction, and
a common electrode line formed in said first direction between adjacent pixel electrode rows for coupling to another side of the storage devices corresponding to adjacent vertically aligned pixel electrodes in said adjacent pixel electrode rows.

6. The liquid crystal display device of claim 5 where said TFTs each have a second domain, the second domain of adjacently aligned TFTs in said second direction adjacent to adjacent first electrical line rows connected in common to an adjacent of said second electrical lines.

7. A liquid crystal display device having a circuit arrangement comprising:
a matrix of liquid crystal elements arranged in adjacent successive rows,
a plurality of selective coupling means each connected to a respective liquid crystal element,
a plurality of storage devices formed substantially adjacent to a respective liquid crystal element and connected on one side to said selective coupling means and said respective liquid crystal element,
a plurality of signal lines formed in a first direction, each connected to a plurality of said selective coupling means,
a plurality of scan lines formed in a second direction transverse to said first direction, each connected to a plurality of said selective coupling means,
said matrix formed so that adjacent, parallel rows of said liquid crystal elements are formed between two of said scan lines so that a pair of scan lines is alternated with a pair of liquid crystal element rows in said first direction and
a single common conductor line formed between said liquid crystal element row pairs and coupled in common to the other side of said storage devices corresponding to said liquid crystal elements of said pair of liquid crystal element rows.

8. The liquid crystal display device according to claim 7 wherein adjacent selective coupling means aligned in said first direction associated with said scan line pairs share a common connection domain with said shared domain connected to an adjacent signal line formed in said first direction.

9. A liquid crystal display device comprising:
a first insulative substrate,
a plurality of first parallel conductive lines and second parallel conductive lines formed on said first insulative substrate, said first parallel lines formed in a first orthogonal direction and said second parallel lines formed in a second orthogonal direction,
a plurality of pixel cells formed on said first insulative substrate with each connected to a corresponding scan and signal line at crossing points of said orthogonal first and second parallel lines, each of said cells including a pixel electrode with all of said cells arranged in a matrix configuration in spacing between said orthogonal first and second parallel lines,
said pixel cells arranged in rows parallel with said first parallel conductive lines such that adjacent parallel pixel cell rows are formed between two parallel conductive lines so that in said second orthogonal direction two adjacent parallel conductive lines alternate with two adjacent parallel pixel cell rows,
transistor means at each of said pixel cells comprising a gate and a source and drain domain and located at a crossing point of each of said first and second parallel lines with a respective gate connected to the crosspoint first parallel line, and with a first of said domains connected to the crosspoint second parallel line, and with a second of said domains connected to a pixel electrode,
a storage device formed substantially adjacent to a respective pixel electrode and having a first terminal connected to said second domain of said transistor means,
a second insulative substrate spatially disposed parallel to said first insulative substrate and having thereon a counter electrode,
a liquid crystal medium interposed between said first and second insulative substrate, and
a single common conductor line formed between said adjacent pixel cell rows for coupling to storage devices corresponding to vertically aligned pixel cells in said adjacent pixel cell rows.

10. The liquid crystal display device according to claim 9 wherein adjacently aligned transistor means in said second orthogonal direction connected relative to two adjacent parallel conductive lines in said first orthogonal direction share a common first domain with said shared first domain connected to an adjacent crosspoint second parallel line.

* * * * *